Feb. 10, 1959   J. C. NEEDHAM   2,873,402
ELECTRIC ARC WELDING SYSTEMS
Filed July 6, 1954   4 Sheets-Sheet 3

Inventor
James C. Needham
By Ralph B. Stewart
Attorney

*Inventor*
*James C. Needham*
By *Ralph B. Stewart*
*Attorney*

United States Patent Office 2,873,402
Patented Feb. 10, 1959

2,873,402
ELECTRIC ARC WELDING SYSTEMS

James Christopher Needham, Greenford, England, assignor to E. R. A. Patents Limited, Leatherhead, Surrey, England, a company of Great Britain Application July 6, 1954, Serial No. 441,429

8 Claims. (Cl. 314—135)

This invention relates to electric arc systems operating either with direct current or alternating current; in particular it is concerned with systems which are operated with a so-called self-adjusting arc, that is to say, systems in which a consumable metal electrode such as is frequently used for arc welding or cutting, is fed towards the workpiece at a pre-set and nominally constant rate and is burned away or consumed by the action of the arc so as to maintain the latter at substantially constant length. The invention is applicable to working under various conditions, for example with bare metal electrodes and with the arc maintained in an atmosphere of inert gas.

The method of operating with a self-adjusting arc is discussed in British patent application No. 8,289 of 1953 and in British Welding Journal, February 1954, pages 71 to 77 where the methods of obtaining a high degree of self-adjustment are described at length. In particular, it is explained that two main factors are stated to give rise to the self-adjustment or control of the length of arc when the rate of feed of the consumable electrode is pre-set. Of these the first briefly is that at constant arc current the rate of consumption of the electrode tends inherently to decrease with increase in the length of the arc, a result said to be due to some reduction in heating efficiency and vice versa; the second factor is that the increase of arc voltage with increase of the length of the arc in a given circuit tends to reduce the current delivered to the arc owing to the volt-ampere output characteristic of the source of supply and vice versa. The first of these factors is an inherent property of the arc, and its magnitude cannot be changed in a given set-up. The second factor depends on the relationship of output current to the output voltage of the source of power supply, and for usual welding power sources that give an approximately fixed working current, that is to say where the change of current with change of arc voltage is small, the degree of self-adjustment of the length of the arc due to the change of current from the source of supply is only slight.

The object of the present invention is to provide for an additional change in the rate of burn-off of the electrode per unit change in arc length or voltage to that due to the two factors referred to above. This is caused according to the present invention, by providing in addition to the change of current with the voltage due to the normal volt-ampere output of the power source above, an additional control of the current in the arc circuit which is dependent upon any factor which reflects the condition of the arc and particularly any deviation of the arc from the desired equilibrium condition. For example, the further control may be conveniently arranged to depend on the voltage across the arc. In order to provide a sensitive control, the latter may be made to respond to the difference between the arc voltage and a datum voltage provided, in which case the control action reverses when the value of the arc voltage passes through the said datum voltage.

However, other factors than the arc voltage may be employed for the purpose of the present invention. For example, an image of the arc may be projected on to an element sensitive to radiation such as a photo-electric cell or a bolometer, and the output from the element may be amplified and arranged to alter the output of the power source either directly or indirectly in such a way that the output is increased if the length of the arc decreases beyond a desired amount and vice versa.

In carrying out the present invention, the control responding to the arc voltage or other factor results in changing a parameter of the circuit either directly or indirectly, for example through a suitable servo system. This control finally affects the arc current and hence the rate at which the electrode is burned-off until at the fixed rate of feed employed, the arc voltage and, consequently, the arc length, is restored to the equilibrium value.

The control may be arranged to be over-riding, that is to say to effect complete control of the current as required by the arc or only partially to control the current to provide a large change of current about the value given by the initial setting up of the parameters of the circuit, the change depending upon deviation of the length of the arc from the desired equilibrium value. In such a case the power circuit is set roughly to give the desired equilibrium condition, and the control mechanism carries out the finer or remaining adjustment necessary to provide the power output required for exact matching and to maintain the same in spite of other variations such as any variations in the rate of feed of the electrode or in the circuit parameters due to warming up of the system, so long as these variations are not too great.

In order to explain the invention more fully, some examples of direct current and alternating current welding systems arranged in accordance with the invention, will now be described more fully with reference to the accompanying drawings, in which.

It will be observed that in the systems for direct current working now to be described, the source of power supply is illustrated as a generator but the source may take other forms and in some cases, a transformer-rectifier may be used.

Figure 1:
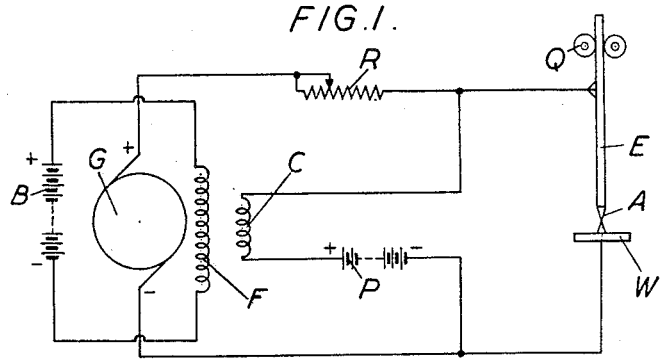
Figure 1 is a circuit diagram suitable for direct current working with a generator as the source of power.

In Figure 1, a simple case is illustrated in which the arc A is supplied from a direct current generator G shown excited independently by a battery B which feeds the field winding F. Equally, of course, the generator G may be shunt-excited. In series with the generator is shown a variable resistance R which regulates the arc current. The control, according to the invention, is effected by providing a separate field winding C for the generator G excited by the difference between the voltage across the arc A and a fixed voltage of a battery P which thus provides a datum potential. The resistance R provides for the desired reduction in voltage between the terminal voltage of the generator G and the arc voltage at the desired working point. Instead of the series resistance R, the generator G may be furnished with a series field winding in opposition to the main field winding F so as to yield a usual form of drooping characteristic. The arc A is shown as struck between the work-piece W and the consumable electrode E which is fed downwardly at a pre-set nominally constant rate by a feeding mechanism, including feed rollers Q. In this case when the arc voltage is greater than that desired owing to the increased length of the arc A caused by burning away the electrode E more rapidly than it is fed, then the output of the generator G is reduced due to the control field winding C and vice versa. The positive terminal of the battery P is connected through the winding C to the electrode E which is the positive side of the arc and the negative terminal of the battery P is connected to the work-piece W. Then, if the voltage passes from a value greater than the datum potential due to the battery P to a value less than that datum potential, the current through the control field winding C reverses. Thus the control operates so as to reduce the electromotive force of the generator G and serves to reduce the arc current if the arc voltage is greater than desired and vice versa.

The system may be somewhat modified with advantage by designing the generator G so as to yield a relatively flat or even an over-compounded characteristic, by providing a series field winding assisting the main field winding F with the control winding C not altered. In all those cases the effect of the control winding C is to cause the generator to deliver current at a voltage which tends to be equal to that of the datum voltage of the battery P.

In order to render the control sensitive, the resistance of the control field winding C should be relatively low in order that a small difference voltage may produce a sufficient current in the control field winding C for a relatively large change in the resultant field of the generator G. Thus in a particular example, the resistance of the control field winding C was 2.5 ohms, and a current of about 0.4 ampere changed the output of the generator G by 5 volts at 250 amperes.

If the normal output voltage of the generator G is less than that desired for the arc current used, the datum potential of the battery P is greater than the desired arc voltage and vice versa. In all cases, the voltage of the battery P is chosen as desired and can be changed to alter the arc voltage at the condition of equilibrium with or without also altering the normal output of the generator G in the same sense.

Figure 2:
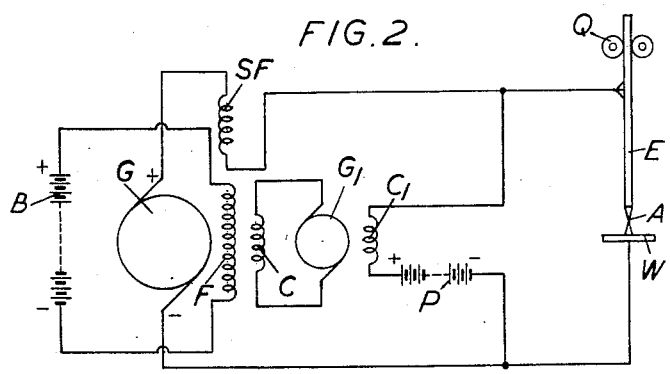
Figure 2 is a circuit diagram of a direct current welding system, in which a generator with a compounding series field is employed with a small exciting machine for the control.

The difference between the voltage across the arc A and the datum potential of the battery P may be amplified. In the example illustrated in Figure 2, the difference between the voltages is applied to the field winding $C_1$ of a small auxiliary direct current generator $G_1$ which is connected to excite the control winding C of the main generator G. In this case the latter is furnished with a series field winding SF but otherwise the arrangement is as in Figure 1 except for the amplifying action of the generator G, and the control operates in the same way as the system shown in Figure 1.

Figure 3:
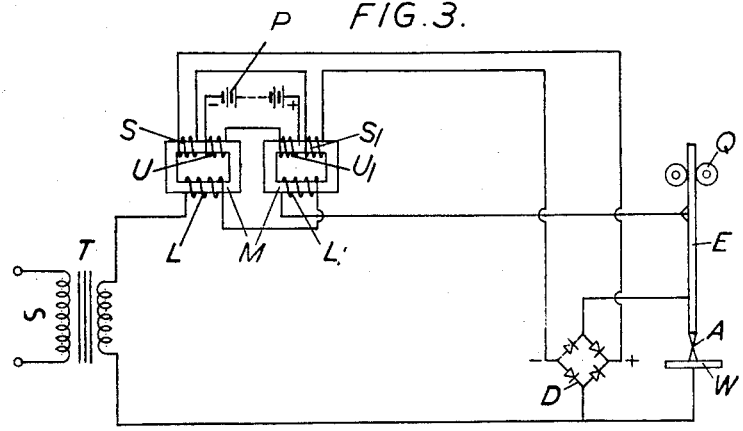
Figure 3 is a circuit diagram of an alternating current welding system, in which the control consists in the alteration of series impedance in the welding circuit.

The control by the arc voltage of the current in a control field winding C may similarly be applied to the field of an alternator which provides the output for the alternating current working in a circuit with series reactance. However, in the case of an alternating current system, the source of supply is often a transformer of which an example appears at T in Figure 3, with the circuit reactance provided by variable leakage between the primary and secondary winding of the transformer. In such a case the control may be effected either by altering the amount of leakage in the transformer T or by altering the degree of saturation of the flux in the transformer core. In the actual example shown in Figure 3, however, the transformer T is a fixed transformer with a variable reactor M in its secondary circuit supplying the arc A. This reactor M consists of two variable inductances or transductors L, $L_1$, the reactance of which is varied by the adjustment of the polarising magnetisation. In fact, in order to produce differential control similar to that in Figures 1 and 2, the arc voltage is rectified in a bridge-connected rectifier D and after smoothing, which is not shown, the voltage is applied to one winding S, $S_1$ on the cores of the reactors L, $L_1$. Another winding U, $U_1$ is energised by the voltage from the battery P which is giving the datum voltage so as to oppose the winding S, $S_1$. In this case, the reactance of the saturable reactor M is high when there is no resultant control magnetisation from the windings S, $S_1$ and U, $U_1$, and when there is resultant magnetisation due to these windings the reactance is lowered because the reactors then operate on a flatter part of their magnetisation curves. Thus, the bias windings U, $U_1$ may be used to set the nominal arc curernt, and the control windings S, $S_1$ supplied by the arc voltage in opposition to the bias windings U, $U_1$ reduce the magnetisation of the core. If the arc voltage is greater than the desired equilibrium value the control acts so as to increase the reactance and thereby reduce the arc current and vice versa. The reactor or transductor M may be of any type but preferably is arranged to be self excited in order to increase the sensitivity of the control system.

Figure 4:
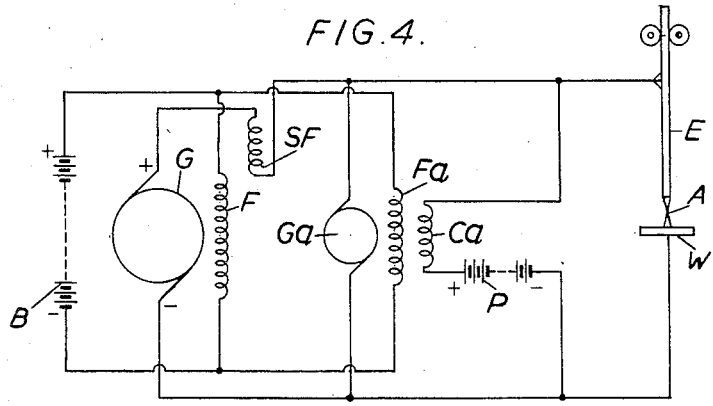
Figure 4 is a circuit diagram of another direct current welding system, including an additional and variable source of power in parallel with the main power circuit.

In a further example illustrated in Figure 4, an auxiliary source of power consisting of a smaller direct current generator Ga is connected in parallel with the arc A and the main generator G, and is provided with a field winding Fa and a control field winding Ca which is supplied with the difference between the voltage across the arc A and the datum potential from the battery P. The output of the auxiliary generator Ga may be set roughly at the required level by the field winding Fa and the final matching to give the desired arc equilibrium is provided by the control field winding Ca. Then the control is effected by the auxiliary generator Ca, in the one case contributing to the total arc current or, in the other case, diverting some of the main circuit current from the generator G away from the arc A, depending upon whether the arc voltage is lower or greater than the desired value.

In a modification of this arrangement, the auxiliary generator Ga is connected in series with the arc to assist or oppose the voltage of the main generator G, and is provided with a control field winding such as Ca supplied with the difference between the voltage across the arc A and the datum potential from the battery P. In this case, the field winding Fa may be dispensed with, and the auxiliary generator Ga reverses in polarity as the arc voltage passes through the voltage of the datum source P. This system also can be applied to alternating current working, in which case the arc voltage may be used after suitable rectification and applied to the field winding of a small alternator replacing the generator Ga and driven in synchronism with the frequency of the power source.

Figure 5:
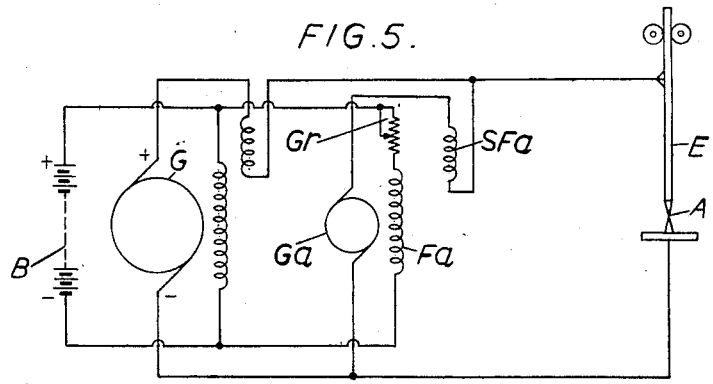
Figure 5 is a circuit diagram of a simplified system with an adjustable auxiliary generator connected across the arc.

A somewhat simplified form of the parallel connected arrangement according to Figure 4 is shown in Figure 5 in which the auxiliary generator Ga is provided with a field regulator Gr, and is a low impedance separately-excited direct current generator with a relatively flat output characteristic which may be provided by a series field winding SFa which assists the field winding Fa. The output voltage may be adjurted by the field regulator Gr to equal the desired arc voltage, then if the latter falls below that of the auxiliary generator Ga, the latter supplies further current into the arc A, to provide the desired equilibrium conditions and vice versa. Instead of using the substantially constant potential generator Ga any other constant voltage source such as a storage battery, may be employed.

Figure 6:
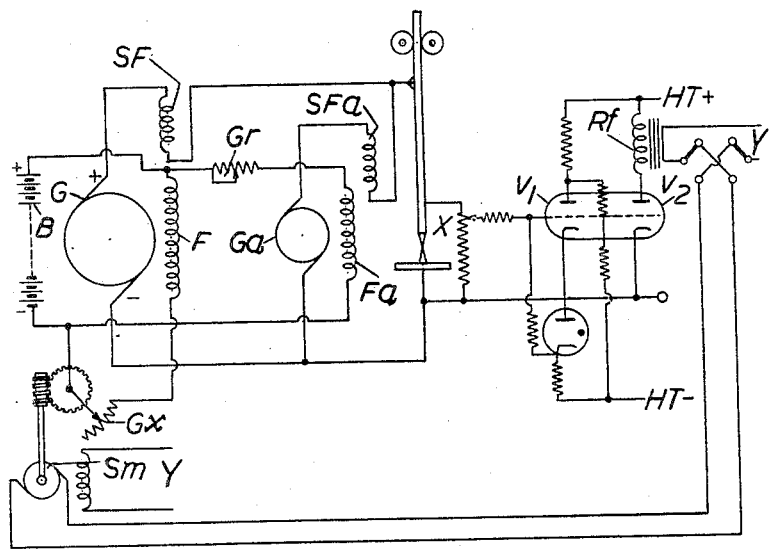
Figure 6 is a circuit diagram of a more complex system in which the power source of supply is controlled by an on/off servo system.

This system may be slightly modified by arranging for the main generator G to be adjusted, for example either manually or automatically by a servo system, until it delivers substantially the desired output for the arc, and then the power requirements of the auxiliary generator Ga are reduced to a low value. This applies also to the system shown in Figure 4 and to the cases in which the auxiliary generator is in series with the arc as well as that shown in Figure 5. Indeed, in Figure 6, a servo system operated by a change-over relay Rf for altering a control on the main generator G is shown. In this case, the arc voltage at which the system changes over, is determined by the setting of a potentiometer X connected across the arc voltage. This change-over point may be made substantially the same as the datum potential used with the auxiliary power source Ga or as the voltage of the low impedance auxiliary generator shown in Figure 5. Actually, in Figure 6 the datum potential is provided by the negative bias from a stabiliser of the grid of the first triode $V_1$ of an amplifier consisting of that triode and another $V_2$ coupled to it. The relay Rf is seen to be in the anode circuit of the valve $V_2$, and changed over at a predetermined current in that anode circuit. In Figure 6 the main generator G is controlled by the on/off servo system since the relay Rf connects a source of supply Y to the armature of a servo motor Sm which is geared as shown diagrammatically, to a field regulator Gx of the main generator G. The relay Rf obviously reverses the direction of rotation of the servo motor Sm at the changeover point.

As alternatives, the servo system shown in Figure 6 may be actuated in dependance upon the voltage across the auxiliary generator Ga when it is connected in series with the arc or by the current from the auxiliary generator Ga when it is connected in parallel with the arc as in Figure 4 or Figure 5. For this purpose, a sensitive voltage-operated polarised relay may be used in the former case, and a current-operated relay in the latter case.

Figure 7:
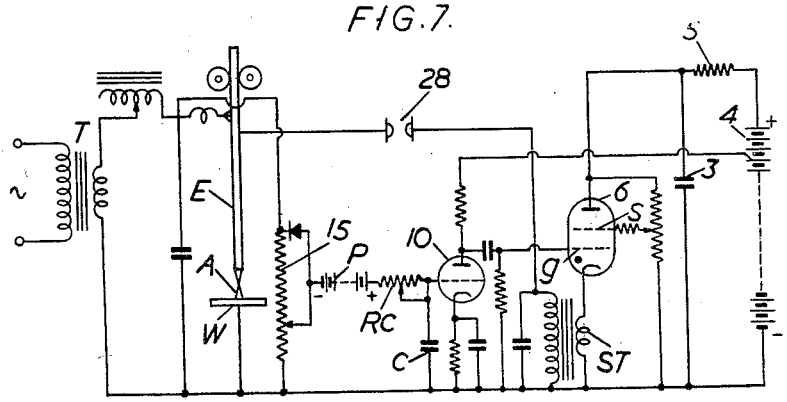
Figure 7 is a circuit diagram of an alternating current arc welding system provided with means for reigniting the arc at timed instants.

The control of the arc current in dependance on the arc voltage may be effected in an alternating current welding system by controlling the time of ignition of an alternating current arc in individual half cycles which, of course, affects the main current which flows during a given half cycle. For example, if the alternating current arc becomes extinguished at the zero of current, that is to say if the open circuit voltage of the source of power supply is insufficient for self-reignition of the arc and an auxiliary and timed source is provided to reignite it cyclically, then a control based on the arc voltage may be applied to the reignition device. An example of this is shown in Figure 7, where the means for reignition is similar to that described in British patent specification 705,164 and in U. S. A. Patent 2,659,036 dated November 10, 1953, and illustrated in Figure 8 of the drawings accompanying those specifications.

In the present Figure 7 additional components to that required for arc reignition means are shown including a resistance-capacity combination. During negative current flow in the arc, a voltage equal to the difference between that across the arc A and the datum potential from the battery P is applied through the resistor Rc of that combination to the capacitor C which is connected to the grid of a triode 10. Following arc extinction, the increasing positive open-circuit voltage charges the capacitor C at a rate depending on the position of the tapping on the potentiometer 15 and on the time constant of the resistor-capacitor combination RC. A potential from the anode of the triode 10 is used to trigger the reigniting means and the time interval between arc extinction and reignition is the time taken to charge the capacitor C to the operating grid voltage of the triode 10. For a given rate of charging, this time is dependent on the pre-charge of the capacitor C, that is on the difference voltage during the preceding half cycle. The similarity of this to the circuit shown in Figure 8 of the above-mentioned prior specifications will be appreciated when it is seen that this trigger impulse from the anode of the triode 10 is applied to the control grid g of a four-electrode gas-filled discharge tube 6, which connects the charged capacitor 3 across the step-up transformer ST, the secondary winding of which is connected to charge a spark gap 28 until the latter is broken down to apply a reignition impulse to the arc A. For convenience, the same reference characters have been applied to the re-igniting circuit in Figure 7 as were used in Figure 8 of the above-mentioned prior specifications.

To arrange for the delayed reignition of the negative half cycle in the same manner, the voltage across the arc may be reversed by a phase inverting transformer and applied to a duplicate to the reignition circuit shown in Figure 7. Equally the trigger impulse circuit alone may be duplicated and the impulses from the two triodes combined and applied to the control grid g of the discharge tube 6.

Figure 8:
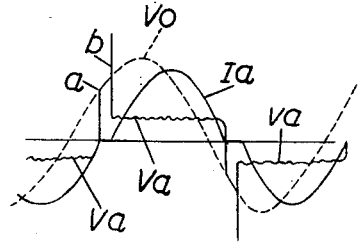
Figures 8 and 9 show wave-forms of voltage and current, respectively with the times of reignition set at different points in the alternating current cycle.
Figure 9:
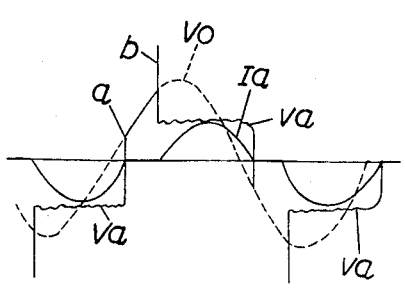

Figures 8 and 9 illustrate waveforms obtained upon arc reignition delayed in dependance on the arc voltage. In these two figures, the open circuit voltage of the power source is shown at Vo and is taken as a sine wave. The current flowing through the arc is shown at Ia and the voltage across the arc at Va. The point of arc extinguishing in Figures 8 and 9 is shown at a and the arc reignition impulse at b. It is clearly seen that in Figure 9, reignition takes place at a later point in the half cycle than in Figure 8, and the current waves Ia show that the total current is smaller in Figure 9 when reignition takes place later.

The main parameters of the circuit may be set in the usual way, but the final adjustment of the arc current is determined by the arc voltage controlling the time of reignition of the arc in successive half cycles, that is to say, by controlling the duration of the pause as described with reference to Figures 8 and 9.

The control of current by delay in the reignition of the arc in dependence on the arc voltage may also be employed in direct current arc systems in which the power source comprises an alternating current source and a grid-controlled rectifier.

Figure 10:
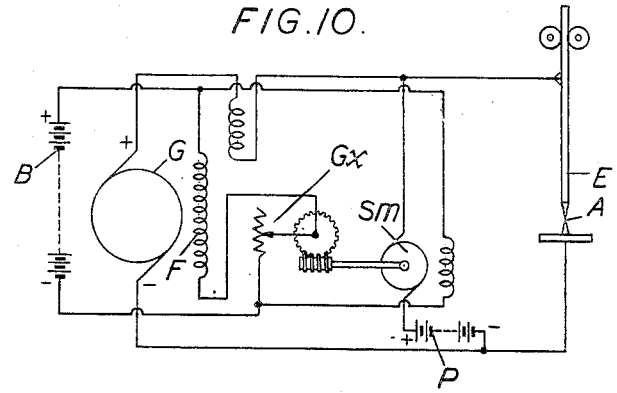
Figure 10 is a circuit diagram of a system in which a servo device is employed so that the arc voltage controls a parameter of the circuit indirectly.

Figure 10 shows the circuit of an example in which a servo device is used in such a way that the arc does not control directly a parameter of the circuit. The difference between the voltage across the arc A and the datum potential from the battery P in this case, is supplied to a small electric motor Sm so that this motor reverses if the arc voltage when changing its value passes through that of the datum voltage from the battery P. The motor S$m$ is shown geared to a field rheostat G$x$ connected to vary the desired parameter of the main circuit or any auxiliary circuit to effect an increase of the arc current when the arc voltage falls below the datum and vice versa. In the particular case of Figure 10, the motor S$m$ is geared to the arm of the field regulator G$x$ of the main generator G.

Figure 11:
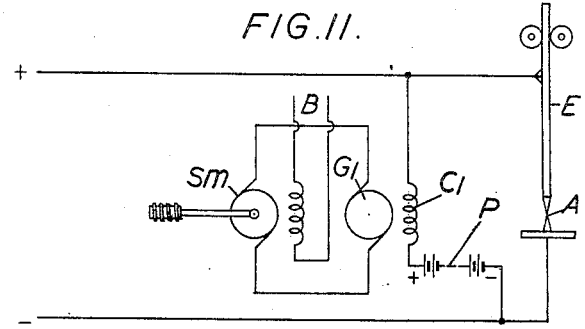
Figure 11 shows a modification of Figure 10, in which the control voltage is amplified by means of a small direct current generator.

The sensitivity of such a control system may be increased by arranging for the difference between the voltage across the arc A and the datum potential from the battery P to be amplified in a thermionic or magnetic amplifier or by a rotary amplifier such as is shown in Figure 11. The amplifier here consists in a generator $G_1$ interposed between the difference potential and the armature of the motor S$m$. The difference potential in this case is applied to the field winding $C_1$ of the generator $G_1$ as in Figure 4, but in Figure 11, the generator $G_1$ supplies the small motor S$m$, which is otherwise geared to a control for the main circuit, for example as in Figure 10.

Figure 12:
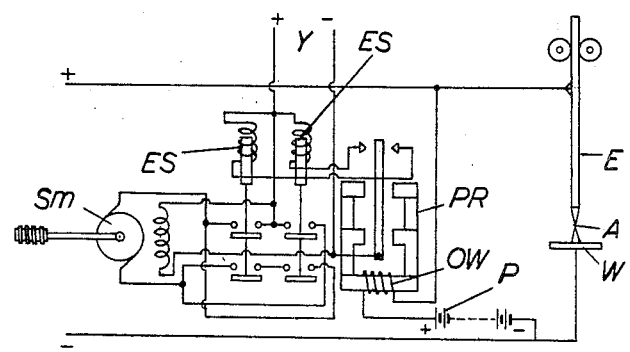
Figure 12 is a circuit diagram of a system where the control voltage operates a polarised relay to alter a parameter of the power supply circuit.

A final form is shown in Figure 12, where the difference between the voltage across the arc A and the datum potential from the battery P is employed to operate a poralised relay PR which, by closing one or other of its side contacts by a simple off/on action, changes a parameter of the power circuit. Actually, in Figure 12, the difference voltage is applied to the operating winding OW of the relay PR, so that the relay closes one or other of its side contacts depending upon whether the arc voltage or the potential of the battery P preponderates. The relay PR energises one or other of two electro-magnetic switches or contactors E, S. The contacts of these switches are connected so that the two switches reverse the current from a source of supply Y to the motor S$m$ which is geared to a regulator as in Figures 10 and 11 although not shown in Figure 12. The sensitivity of the off/on relay system may be increased by amplification, for example, electronically as shown in Figure 6.

Certain refinements can be introduced in the examples of the invention described above to suit particular requirements. For example, it may be convenient to arrange for the control, such as a servo-mechanism, the auxiliary power source or the control field of the main power source, to be rendered inoperative except during the arcing process so that it is not in action, say, when the power source is open-circuited or switched off. Thus the input connections to the control system and the circuit of the small servo motor or both may be arranged to be completed only when power is being delivered by the power source, for example by means of a relay operated by the arc current.

A control system dependent on the difference between the arc voltage and a datum potential has other advantages, apart from assisting in maintaining the arc length in equilibrium. Thus the control system permits remote control of arc length and arc voltage by adjusting the datum voltage. Also, the servo control permits remote operation of the circuit parameters, by separately switching the small servo motor.

Again, the control system can be arranged to maintain equilibrium by altering the current to the arc while the rate of electrode feed is being charged, either manually or by means of some independent automatic or servo control, to operate at a higher rate of electrode feed, and hence at a higher current; or, similarly the control system may be used to adjust the current delivered to the arc to match the rate of electrode feed after it has been changed.

If the rate of electrode feed is accurately fixed or controlled, then the control according to this present invention can be used to regulate or prevent drift in the power circuit. Thus any deviation in power supplied from that desired, and resulting in a change of arc voltage or arc length is used to effect a control such that the power supplied to the arc is returned to the desired equilibrium.

The reference or datum voltage used in the invention, although normally considered as fixed in order to establish equilibrium at a given arc voltage, may be made a variable according to the operating points required. Thus, if it is desired to operate at different arc lengths during, say, the welding of a complex structure, then the datum voltage can be arranged to be changed according to the required arc voltages. Similarly, if it is desired to operate at different arc voltages depending on the current, then the datum voltage can be made a function of the working current. Thus, when the rate of electrode feed is changed, that is, the power required by the arc is changed, the control not only alters the circuit power accordingly, but establishes a balance at the desired changed arc voltage.

Another advantage of the control is that, as already indicated, the operator need not establish the correct match between electrode feed rate and the arc burn-off rate at the current and voltage desired, since the control carries out the match according to the desired arc voltage and arc length. The arc current, if not as desired, may be altered manually or automatically by changing the rate of electrode feed, and again the control maintains equilibrium. It is desirable, particularly with servo control, that the control shall pull in as rapidly as possible and thereafter maintain equilibrium without hunting.

In the detailed examples given, the datum voltage has usually been provided by a battery or in the systems shown in Figures 6 and 7 as a bias voltage in an electronic circuit. It may, of course, be more convenient to provide the datum potential by means of a small generator, or a transformer-rectifier system and so forth.

I claim:

1. In an electric arc system for operating upon a work-piece, comprising in combination means for feeding a consumable electrode towards the work-piece at a pre-set rate and a power supply circuit connected to supply to the arc current which changes in value with change in the length of the arc so that the arc is self-adjusting in length, a control circuit connected between said electrode and said work-piece and comprising in series a source of direct current potential arranged in opposition to the voltage of the arc and having the value required in the arc and electrical control means, said electrical control means being connected to vary the current in said power supply circuit upon changes of voltage of the arc from the required value and thus provide a control supplementing the self-adjustment of the length of the arc.

2. In a system according to claim 1 and having a direct current generator as the source of power supply in said power supply circuit, said generator having a field winding constituting said electrical control means.

3. In a system according to claim 1 and having a direct current generator as the source of power supply in said power supply circuit, said generator having a field winding controlled by said electrical control means, said electrical control means being in the form of an amplifier.

4. In a system according to claim 1, and having a direct current generator as the source of power supply in said power supply circuit, and also having an auxiliary generator, said auxiliary generator being connected in parallel to the said direct current generator and having a field winding, said field winding of said auxiliary generator constituting said electrical control means.

5. In a system according to claim 1, said electrical control means including a reversible direct current electric motor.

6. In a system according to claim 1, said electrical control means being the winding of a polarised electromagnetic relay, and also comprising a reversible electric motor controlled by said relay and arranged to vary the current in said power supply circuit.

7. In a system according to claim 1, a combination comprising a control electric generator having a field winding constituting said electrical control means, and a reversible electric motor connected to be supplied by said control electric generator and serving to vary the current in said power supply circuit.

8. In an electric arc system for operating upon a work-piece, comprising in combination means for feeding a consumable electrode towards the work-piece at a preset rate and a power supply circuit connected to supply to the arc current which changes in value with change in the length of the arc so that the arc is self-adjusting in length, the combination of a control circuit connected between said electrode and said work-piece and comprising in series a source of direct current potential arranged in opposition to the voltage of the arc and having the value required in the arc, and the winding of a polarised electromagnetic relay, an operating circuit controlled by said relay, and a reversible electric motor controlled by said operating circuit and controlling the current supplied to the said arc by said power supply circuit.

References Cited in the file of this patent

UNITED STATES PATENTS

| | | |
|---|---|---|
| 2,636,102 | Lobosco | Apr. 21, 1953 |
| 2,662,201 | Wiley | Dec. 8, 1953 |